UNITED STATES PATENT OFFICE 2,564,105

AQUEOUS METHIONINE NITRILE SULFATE

William F. Gresham and Carl E. Schweitzer, Wilmington, Del., assignors to E. I. du Pont de Nemours & Company, Wilmington, Del., a corporation of Delaware No Drawing. Application August 3, 1949, Serial No. 108,421

1 Claim. (Cl. 260—465.5)

This invention relates to improvements in the synthesis of methionine, and to novel compositions of matter employed in the said synthesis. More particularly this application relates to alpha-amino-methylmercaptobutyronitrile. This application is a continuation-in-part of our copending application S. N. 624,323 filed October 24, 1945, now U. S. Patent 2,485,236, which in turn is a continuation-in-part of our earlier application S. N. 522,966, filed February 18, 1944, now abandoned.

The classical method for the synthesis of methionine is the method disclosed by Barger and Coyne (Biochem. J. 22, 1417-25 (1928)). According to that well-known procedure, beta-methylmercapto-propionaldehyde is subjected to a Strecker synthesis, by means of which methionine is obtained in about 6% yield (cf. Organic Syntheses, volume XIV, page 60).

An object of the present invention is to provide novel compositions of matter which are especially adapted for use in the synthesis of methionine. Another object is to prepare methionine nitrile sulfate as a novel composition of matter. Other objects of this invention will appear hereinafter.

These and other objects are accomplished in accordance with this invention by means of a series of coacting and interdependent operations comprising the following steps: (1) reaction between methyl mercaptan and acrolein to form beta - methylmercaptopropionaldehyde in the presence of an alkaline or non-acidic (preferably an amine) catalyst; (2) addition of hydrogen cyanide to the resultant beta-methylmercaptopropionaldehyde, preferably also in the presence of an alkaline catalyst, such as pyridine, to form alpha - hydroxy-gamma-methylmercaptobutyronitrile; (3) reaction of alpha-hydroxy-gamma-methylmercaptobutyronitrile with excess ammonia under high pressure to produce alpha-amino-gamma-methylmercaptobutyronitrile; and (4) reaction of the said alpha-amino-gamma-methylmercaptobutyronitrile with aqueous sulfuric acid, which produces alpha-amino-gamma-methylmercaptobutyronitrile sulfate. On boiling this material with 40–60% aqueous sulfuric acid, methionine sulfate is produced. Lower or higher concentrations of sulfuric acid result in decreased yield due to the formation of tars. Similarly, phosphoric acid in place of sulfuric acid produces tars almost to the exclusion of methionine phosphate. In accordance with this invention, this synthesis of alpha-amino-gamma-methylmercaptobutyronitrile sulfate is accomplished in nearly quantitative yield, and the overall yield of methionine is about 70%.

The first step in the synthesis, namely, the reaction between methyl mercaptan and acrolein, is best performed at a temperature of about 0° to 20° C., in the presence of 0.05 to 5.0%, preferably 0.1 to 0.5%, of pyridine, based on the weight of the methyl mercaptan used. As the reaction proceeds, the temperature may be allowed to increase somewhat, but it should not be allowed to rise above about 50° C., else excessive polymerization of the acrolein will occur. The methyl mercaptan preferably should be present in excess of the amount theoretically required. In fact, about 2 mols of methyl mercaptan per mole of acrolein is usually desirable. One reason for this is to permit control of the reaction temperature, since the exothermic heat of the reaction can be dissipated conveniently as heat of vaporization of methyl mercaptan. Accordingly, the reaction vessel is generally equipped with a reflux condenser operated at a temperature of 0° C. or lower for return of vaporized mercaptan to the reaction. If desired, the heat may be withdrawn by external cooling. In carrying out the reaction between acrolein and methyl mercaptan, care must be exercised to prevent excessive polymerization of the acrolein before it has had a chance to react with the mercaptan. This is achieved by inhibiting the acrolein with about 0.1% of hydroquinone, and by very efficient stirring of the mercaptan while adding the acrolein thereto. It is important that the acrolein be introduced directly into the mercaptan and not, for example, along the inner walls of the reaction vessel, where polymerization of the acrolein may occur because of the alkaline catalyst present. Towards the end of the reaction, which usually requires from 10 to 30 minutes, the temperature is preferably allowed to reach about 20° C. After the reaction is complete, the excess methyl mercaptan may be stripped off, and, if desired, the residue may be distilled to yield as the almost exclusive product, beta-methylmercaptopropionaldehyde. This novel procedure gives beta - methylmercaptopropionaldehyde in very high yield (98%).

The next step in the process of this invention is the preparation of the cyanohydrin of beta-methylmercaptopropionaldehyde, namely, alpha-hydroxy - gamma-methylmercapto-butyronitrile, which is prepared also by the use of pyridine as the preferred catalyst. Consequently, the beta-methyl-mercaptopropionaldehyde obtained in the preceding step need not necessarily be distilled or otherwise freed of pyridine, hence acrolein methyl mercaptan addition product, containing pyridine, may be treated directly with hydrogen cyanide. In the second step of this invention, hydrogen cyanide, preferably in about 10% excess, based upon the beta-methyl-mercaptopropionaldehyde is added to the reaction product of the first step at a temperature in the range of about 15° to 75° C. (preferably 35° to 55° C.) with 0.1 to 0.5% of an amine catalyst, such as pyridine. The formation of the cyanhydrin takes place very easily, yield after about 30 minutes reaction time being practically quantitative.

In a specific embodiment, this hydroxynitrile, namely alpha-hydroxy-gamma-methylmercaptobutyronitrile, may be isolated in pure form, and thereafter aminated as hereinafter set forth. This alpha-hydroxy-gamma-methylmercaptobutyronitrile is a novel composition of matter which is particularly useful in, and especially adapted for, the herein described process for making methionine. Prior investigators in this field have never succeeded in isolating this material, or even obtaining it in crude or transitory form, and, consequently, these prior processes for making methionine from beta-methylmercaptopropionaldehyde without obtaining this intermediate have invariably given low yields.

The hydroxynitrile mentioned above has outstanding utility as a methionine precursor or intermediate. The conversion of the hydroxynitrile to methionine is accomplished by a series of steps, the first of which is to subject it to the action of ammonia. It is not necessary to separate the pyridine or other amine catalyst from the product of the preceding step prior to carrying on this amination, but such separation may be effected if desired. The reaction of alpha-hydroxy-gamma-methylmercaptobutyronitrile with ammonia is preferably accomplished by processing alpha-hydroxy-gamma-methylmercaptobutyronitrile at a temperature in the range of 10° to 150° C., preferably 75° to 90° C., with a large excess of ammonia (at least 5 moles of ammonia per mole of cyanhydrin, preferably 10 to 30 moles), at a superatmospheric pressure of 5 to 1000 atmospheres, preferably about 10 to 100 atmospheres. At about room temperature the reaction may require up to 12 to 15 hours or more for completion, but at 80° to 90° C., the reaction is complete in 15 to 20 minutes. The yield of alpha-amino-gamma-methylmercaptobutyronitrile (i. e., methionine nitrile) under these conditions is virtually quantitative.

This aminonitrile (i. e., methionine nitrile) is disclosed in our earlier applications S. N. 522,966 and S. N. 624,328. Prior attempts to obtain either this aminonitrile or the hydrochloride thereof have invariably met with failure. For example, Barger and Coyne (loc. cit., pages 1420–1) reported that attempts to obtain the hydrochloride of this aminonitrile have not been successful. The success of the present methionine synthesis is due, in large measure, to the fact that the hydroxynitrile, and the aminonitrile, are both obtained in isolable form. The pure aminonitrile, which is described in detail below, is a thermally unstable compound, which cannot be distilled under ordinary conditions, i. e. at pressures above a few millimeters. It can be hydrolyzed, however, to give methionine in good yields. Specific methods for the hydrolysis of this nitrile are set forth in U. S. Patents 2,432,478, 2,443,391 and 2,432,429. The successful preparation of the aminonitrile is probably due to the fact that the cyanhydrin is first obtainable, as stated above, in isolable form, and is thereafter treated with high pressure ammonia. Ordinary ammoniation does not give a satisfactory result. In fact, unless very large excess, or high pressure, of ammonia is used, preferably above about 30 atmospheres, a mixed product containing appreciable amounts of the unreacted cyanhydrin is obtained. The purest aminonitrile is thus prepared at high ammoniation pressures. This is important since the separation of the aminonitrile from the cyanhydrin by physical methods is quite difficult or virtually impossible. This is due in part to the thermal instability of the aminonitrile.

Because of the almost quantitative yield in the amination step, the hydrolysis of alpha-amino-gamma-methylmercaptobutyronitrile to methionine may be effected without intermediate steps or processing of materials. In continuous operation, the product of the preceding step is pumped through a reaction vessel along with hot aqueous acid, such as sulfuric acid of about 10 to 70% concentration, preferably about 50%. This produces an aqueous solution of methionine nitrile sulfate. A preferred procedure is to mix the alpha-amino-gamma-methylmercaptobutyronitrile with 50% sulfuric acid, and to heat the resulting methionine nitrile sulfate solution at a temperature close to the boiling point for about an hour or longer. Thereafter the mixture is cooled to about room temperature, and the sulfuric acid is neutralized with ammonia. In certain instances the product at this stage has a rather dark color, which can be removed by means of decolorizing charcoal. To isolate methionine from the resultant solution, any of the conventional techniques for separating a solute from a solvent may be employed. The water may be removed at low pressure, and the methionine can be extracted from the ammonium sulfate in the resulting residue by a suitable solvent. Alternatively, the solvent may be evaporated and the product isolated by fractional crystallization. The yield in the hydrolysis step generally is within the range of 70 to 75%, calculated on the basis of the pure recrystallized product.

*Example.*—Into a 200 cubic centimeter 3-necked flask equipped with a stirrer, a Dry-Ice reflux condenser, a thermometer and a dropping funnel is placed a mixture of 96 grams of methyl mercaptan and 0.3 gram of pyridine. With rapid stirring, acrolein (56 grams) containing 0.1% hydroquinone is introduced dropwise through the dropping funnel, initial temperature being 5° C. As the reaction proceeds it is necessary to absorb part of the reaction heat by surrounding the reaction vessel with an ice water bath. The reaction continues for about one hour, during which time the reaction mixture is allowed to warm up to 20° C. The unreacting mercaptan (52 grams) and acrolein (3.6 grams) are recovered by distillation at low pressure, the receiver being a cold trap at −80° C. There remains a residue which distills quite completely at 60° C., 12 mm., which is the boiling point of beta-methylmercaptopropionaldehyde (weight of beta-methyl-mercaptopropionaldehyde, 96 grams). This aldehyde is returned to the reaction vessel and a little pyridine (0.3 gram) is added. Into the mixture is introduced 27.2 grams of liquid hydrogen cyanide. By suitable cooling, the temperature of the mixture is maintained at 40° to 45° C. for about 20 minutes. The formation of the cyanhydrin takes place quite smoothly. When the reaction is complete the excess hydrogen cyanide is removed by low pressure distillation into a cold trap. There remains 118 grams of the cyanhydrin, i. e., alpha-hydroxy-gamma-methylmercaptobutyronitrile.

If it is desired to convert the cyanhydrin to methionine, the product thus obtained is transferred to a pressure resistant silver-lined vessel of about 900 cc. capacity, and ammonia (300 grams) is injected. The vessel is then agitated and heated to a temperature of 80° to 90° C., the contents being under an autogenously developed pressure of about 40 atmospheres. After 15 minutes at this temperature the reaction mixture is cooled, and then withdrawn from the reaction vessel. Upon evaporation of the ammonia there remains a residue which is a mixture of water and alpha-amino-gamma-methylmercaptobutyronitrile. An aliquot portion of this residue is placed in a distilling flask and water is removed therefrom by evaporation at low pressure. The remaining residue, which is alpha-amino-gamma-methylmercaptobutyronitrile, is obtained in quantity corresponding to nearly quantitative yield. This residue is thereafter added to the main portion of the aqueous aminonitrile. Without separating the water from this aminonitrile, the mixture is added dropwise to a solution containing 180 grams of concentrated sulfuric acid and 180 grams of water. The resulting mixture, which is an aqueous solution of the sulfuric acid salt of methionine nitrile, is boiled for 1.5 hours. Thereafter, it is cooled to room temperature, and neutralized with aqueous ammonium hydroxide. The solution thus obtained is decolorized by boiling with a few grams of decolorizing charcoal. After removal of the charcoal by filtration, the solution is placed in an evaporator, and water is removed at diminished pressure until there remains a solid mixture of methionine and ammonum sulfate. By repeated extraction with liquid ammonia, the methionine is removed from the ammonium sulfate. The methionine is isolated by evaporation of ammonia from this extract. There is obtained crude methionine which on recrystallization from water yields 112 grams of pure methionine, melting at 283° C.

It will be understood that the present invention is not limited to the particular embodiments which are hereinbefore used as illustrations. For example, it is not essential that the same catalyst, pyridine, be employed in the first two steps in the synthesis of methionine, although generally there is an advantage in doing so. If desired, other non-acidic catalysts may be employed for the reaction between acrolein and methyl mercaptan. Thus, charcoal, amines (piperidine, quinoline, methionine nitrile, triethanolamine, etc.), lime, alkali metal alcoholates and the like are operative as catalysts in the first step. If desired, the product obtained in step (2), (alpha-hydroxy-gamma - methylmercaptobutyronitrile) may be neutralized or acidified prior to the amination, because its storage properties are better in the absence of alkali. Other acids besides sulfuric acid may be employed in the hydrolysis of the aminonitrile to methionine, although comparatively poor results are obtained with hydrochloric acid. For example, when equimolal quantities of the aminonitrile and 37% hydrochloric acid are heated at refluxing temperature for one hour, or allowed to stand overnight at room temperature, a poor conversion (less than 20%) to methionine is obtained. So far as methionine synthesis is concerned, the improved results reported herein are due in part to the formation of methionine nitrile sulfate prior to hydrolysis.

Since many different embodiments of this invention may be made without departing from the spirit and scope thereof, it will be understood that we do not limit ourselves except as set forth in the appended claim.

We claim:

Aqueous alpha-amino-gamma-methylmercaptobutyronitrile sulfate.

WILLIAM F. GRESHAM.
CARL E. SCHWEITZER.

REFERENCES CITED

The following references are of record in the file of this patent:

UNITED STATES PATENTS

| Number | Name | Date |
|---|---|---|
| 2,432,478 | Lecky | Dec. 9, 1947 |
| 2,443,391 | Kirkpatrick | June 15, 1948 |
| 2,485,236 | Gresham et al. | Oct. 18, 1949 |

OTHER REFERENCES

Barger et al., "Biochem. J.," vol 22 (1928), pp.1420–1421.

Catch et al., "Nature," April 26, 1947, pp. 518–519.